E. B. WILES.
COMBINED MOTOR AND TRANSMISSION CONTROL.
APPLICATION FILED OCT. 1, 1921.
1,436,422.
Patented Nov. 21, 1922.
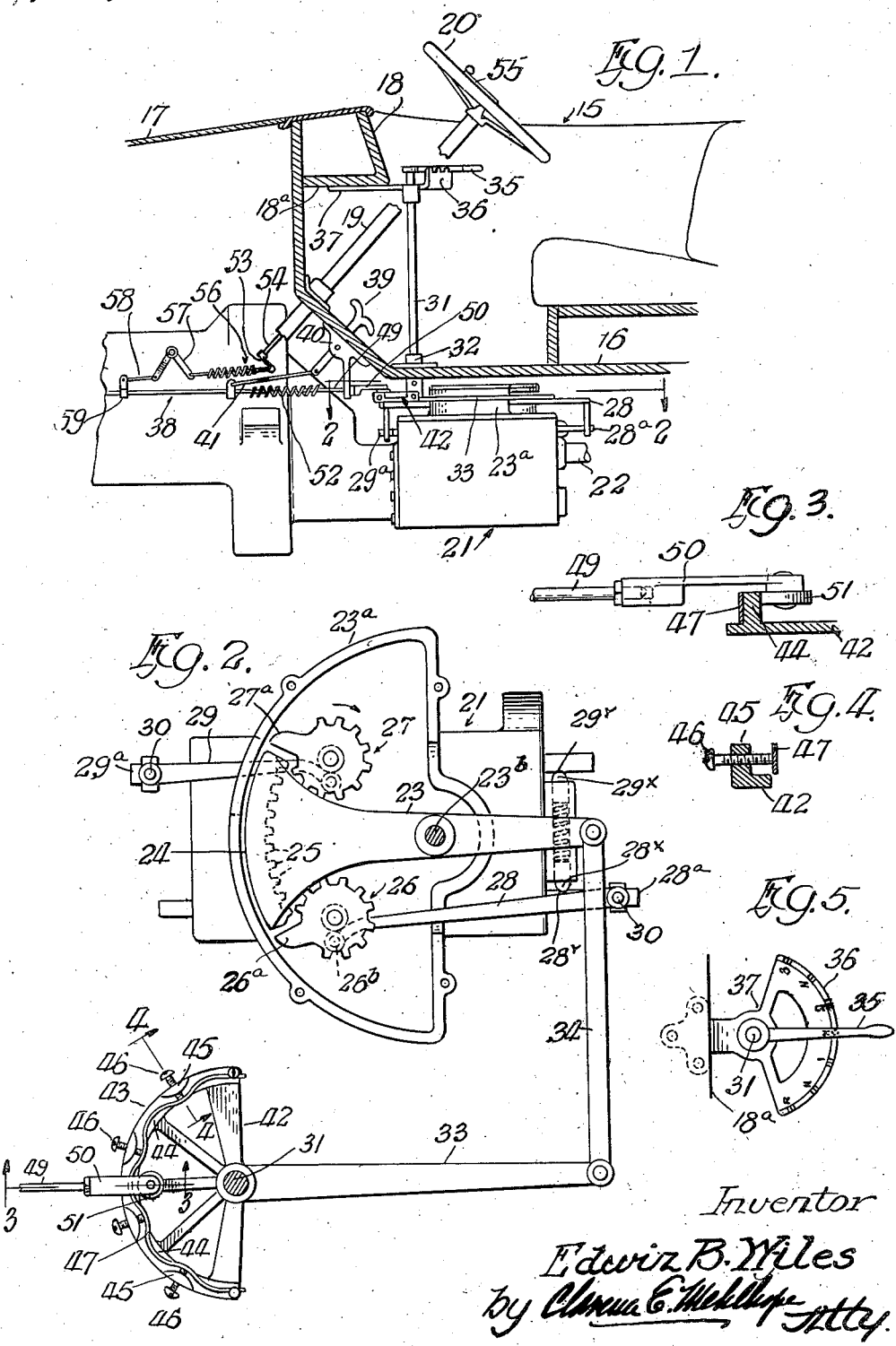

Patented Nov. 21, 1922.

1,436,422

UNITED STATES PATENT OFFICE.

EDWIN B. WILES, OF KANSAS CITY, MISSOURI.

COMBINED MOTOR AND TRANSMISSION CONTROL.

Original application filed November 8, 1920, Serial No. 422,455. Divided and this application filed October 1, 1921. Serial No. 504,541.

*To all whom it may concern:*

Be it known that I, EDWIN B. WILES, a citizen of the United States, and a resident of Kansas City, in the county of Jackson and State of Missouri, formerly of Chicago, Illinois, have invented certain new and useful Improvements in Combined Motor and Transmission Controls; and I do hereby declare that the following is a full, clear, and exact description thereof, reference being had to the accompanying drawings, and to the letters of reference marked thereon, which form a part of this specification.

This invention relates to a novel and improved combined motor and transmission control and consists of the matters hereinafter described and more particularly pointed out in the appended claims.

The present application, except as hereinafter indicated, is a divisional application and presents matter originally included in an application filed November 8th, 1920, Serial Number 422,455, entitled Gear shift mechanism.

The advantages of the invention will be pointed out as I proceed with my specification.

In the drawings:—

Figure 1 is a view representing a partial longitudinal section through the front end of an automobile showing my improved combined motor and transmission control.

Figure 2 is a view on an enlarged scale representing a plan of the mechanism embodying the invention in a plane indicated by the line 2—2 of Figure 1.

Figure 3 is a detail sectional view of Figure 2 in a plane indicated by the line 3—3 of Figure 2.

Figure 4 is a like sectional view of Figure 2 in a plane indicated by the line 4—4 thereof.

Figure 5 is a top plan view of a controlling arm and sector by means of which the gear shift is operated.

Referring now to that embodiment of the invention illustrated in the drawings:—15 indicates the body of a motor vehicle, 16 the floor thereof, 17 the hood, 18 the dash, and 19—20, the usual steering post and steering wheel.

21 indicates the transmission gear box; 22 is the driven shaft which drives the familiar differential gearing (not shown) and which itself is driven by the motor shaft (not shown) either directly or through the gearing in the gear box.

The gear shift contained in the box 21, may be, and is preferably, of the kind illustrated and described in my above named application, Serial Number 422,455. Said gear shift is operated by means of a horizontal, oscillatable arm 23, located above the transmission gear casing in a semi-cylindrical casing 23ª. Said arm is pivotally mounted on an upright stud or pin 23ᵇ. The arm 23 has an arcuate flange 24, provided with internal gear teeth 25. Arranged at either side of the arm 23, and mounted on suitable studs in the bottom wall of the casing 23ª, are mutilated gears 26—27, which are adapted to be engaged by the internal teeth 25 of the arm 23. Said gears have radial shoulders 26ª—27ª, which are adapted to be engaged by the ends of the flange 24, which engagement imparts an initial rotative movement to the gear 26 or 27. The gear 26 has a crank pin 26ᵇ, which is connected by a pitman 28 to a gear shift rod 28ª, and the gear 27 is similarly connected by a crank pin 27ª and pitman 29 to the other gear shift rod 29ª, said pitmen being extended in opposite directions, the one 29 towards the front of the vehicle or to the left, as seen in Figure 2, and the other, towards the rear or to the right, as seen in that figure. Each pitman is connected to its associated rod by means of a suitable swivel joint 30 which permits the necessary swing of the pitman. The rods 28ª, 29ª are yieldingly locked, when their respective yokes are in neutral position, by means of spring controlled pins 29ˣ, 28ˣ (see Figure 2) which are mounted in a suitable box in the end wall of the casing 21, and which are adapted to engage in notches 29ʸ, 28ʸ.

By the operation of the arm 23, first to the right to give a quarter turn to the gear 27, and then to the left, restoring said gear 27 to first position and imparting a three-quarter turn to the gear 26, the gear shift in the box 21 is designed to be carried through the usual three speeds in succession with a neutral point between each speed. The movement of the arm 23 to the right again brings the several speeds into operation in the reverse order, and a further movement of the arm 23 beyond its position when the first speed is given, brings the reverse gearing into play—all as more fully and in detail described in my aforesaid original application.

The arm 23 is extended through suitable slots in the walls of the casing 23ª, as are also the pitmen 28 and 29. To operate the arm 23 I provide at one side of the steering post 19 an upright shaft 31 which is suitably mounted in a standard 32 attached to the floor of the vehicle. Said shaft extends through and below the floor into the plane of the arm 23, and a radius arm 33, fixed to the bottom end of said shaft and extending substantially parallel to the arm 23, has its rear end connected to the rear end of said arm by a link 34. A lever arm 35 is attached to the top of the shaft 31 and is adapted for coaction with a notched segment 36 on a plate 37 attached to the bottom wall 18ª of the dash 18. The notches in the segment are arranged to correspond with the different positions of the lever arm 35 corresponding to the positions of the arm 23 for the several speeds including the reverse and the neutral points intermediate said speeds. The segment bears numbers or other indicia to denote the several speeds at the different points as clearly indicated in Figure 5.

The gear shift is connected with the throttle valve in the following manner:— 38 indicates the operating rod for the throttle, said rod being capable in the examples illustrated, of a longitudinal reciprocable movement,—to the left as shown in Figure 1, to close the throttle, and to the right to open the throttle. A foot pedal lever 39 is pivotally mounted on a bracket 40 attached to the floor of the vehicle, and has its bottom end connected by a link 41 to the throttle rod 38. The foot pedal 39 is capable of a rocking movement forward and back, readily brought about by raising and lowering the heel,—the first movement operating to push the rod 38 forwardly to close the throttle, and the second movement operating to pull the rod 38 rearwardly to open the throttle. In this way a positive control of the throttle valve is provided both in the opening and in the closing of the throttle, and springs for this control are obviated.

In addition to the foregoing positive control of the throttle valve, I also provide means for connecting the throttle valve with the gear shift, so that said valve is actuated automatically during the shifting of the gears. Said means are as follows:— On the bottom of the gear shift control shaft 31, is fixed a segment 42. Said segment has an arcuate rim 43 on which are arranged a plurality of arcuate inwardly facing shoulders 44, said shoulders each corresponding with a neutral position of the gear shift. Midway between said shoulders, and spaced radially outward therefrom, are a plurality of shoulders 45, through which extend adjusting screws 46, and a flat spring band 47 is arranged about the outer faces of the shoulders 44 and against the inner ends of the adjusting screws 46 as clearly shown in Figure 2. By adjustment of the screws 46, the part of the spring band intermediate the inwardly facing shoulders 44 may be approached nearer to the center of the segment than the shoulders themselves, the amount being determined by the adjustment of said screws. In line with the throttle rod 38 is a short supplemental rod 49, carrying at its rear end a finger 50, adapted to engage, through the medium of an anti-friction roller 51, with the inwardly facing shoulders 44, and with the parts of the spring band 47 exposed between said shoulders. The supplemental rod is connected by a spring 52 to the main throttle rod 38. These parts are so adjusted and arranged that when the roller 51 is engaged with one of the inwardly facing shoulders 44, the throttle rod 38 will be pushed forward to its limit so as to close the throttle valve. When the roller engages a part of the spring band intermediate the inwardly facing shoulders 44, which points correspond to the position of the shift mechanism when the driven shaft is in one or the other of the several speeds or reverse, the throttle will be held open a certain amount, as, for example, to drive a car at ten, fifteen, or twenty miles an hour, or even more, depending upon the adjustment of the screws 46. By this arrangement, when the gear shift is passing from one speed through the neutral point to another speed, the throttle will be automatically closed during the time that the shift passes through the neutral point, and will be automatically opened, gradually, to operate the motor at the predetermined speed when one or the other of the speeds is brought into play; but in each case of shift of the gear from one speed to the other, the throttle will be closed at each neutral point, which permits the shifting of the gears without actuating the vehicle clutch.

By reason of the spring 52, it will be manifest that the foot pedal 39 may be operated independently of the segment 42. The car, however, may be driven with the throttle controlled entirely by said segment, in which case it is not necessary to use the foot pedal 39 at all unless in emergency, as where the speed at which the segment 42 is adjusted, is found to be for the moment too high, as in passing a vehicle, or when slowing up for any other reason, without shifting the gears.

In addition to the foregoing, all of which was disclosed in the aforesaid original application, I provide preferably the following construction, in order that the throttle may be set by the usual gas lever to correspond with a certain speed at which the engine may be run, independently of the other controls described: This comprises the usual crank arm 53 at the bottom of the shaft 54, which extends up through the steering post 19 and carries at its top end the usual gas arm 55; yielding link 56; a bell crank lever 57 fulcrumed at the side of the engine; and a rod 58 pivotally connected to a lug 59 fixed to the throttle-valve-rod 38 at a point nearer the throttle valve than the connection of the foot pedal 39 with said rod.

By this construction, the throttle valve may be set by means of the usual gas lever 55, and the foot pedal 39 may be operated independently, to open or close the throttle valve to points above or below the point set by said gas lever.

Many advantages of the invention will be apparent to those familiar with the art. While in describing my invention I have referred to certain details of mechanical construction and arrangement of parts, it is to be understood that the invention is to be in no way limited thereto except as pointed out in the appended claims.

I claim the following as my invention:—

1. In combination with a gear shift mechanism, including a rock shaft, adapted to shift the gears through the several speeds and neutral points in succession, a segment fixed to said shaft, means providing a trackway on said segment having low points corresponding to the neutral points, and high points corresponding to the several speeds of said gear shift, a rod for operating the engine throttle valve, and a finger connected to said operating rod and adapted to ride on said trackway.

2. In combination with a gear shift mechanism, including a rock shaft, adapted to shift the gears through the several speeds and neutral points in succession, a segment fixed to said shaft, means providing a trackway on said segment having low points corresponding to the neutral points, and high points corresponding to the several speeds of said gear shift, means for adjusting the high points of said trackway, a rod for operating the engine throttle valve, and a finger connected to said operating rod and adapted to ride on said trackway.

3. In combination with a gear shift mechanism, including a rock shaft adapted to shift the gears through several speeds, and neutral points in succession, a segment fixed to said shaft, means providing a trackway on said segment having low points corresponding to the neutral points, and high points corresponding to the several speeds of said gear shift, a main operating rod and foot pedal lever for operating the throttle valve, and a finger yieldingly connected to said operating rod and adapted to ride on said trackway.

4. In combination with a gear shift mechanism, including a rock shaft adapted to shift the gears through the several speeds and neutral points in succession, a segment fixed to said shaft, means providing a trackway on said segment having low points corresponding to the neutral points, and high points corresponding to the several speeds of said gear shifts, means for adjusting the high points of said trackway, a main operating rod and foot pedal lever connected thereto for operating the engine throttle valve, and a finger yieldingly connected to said operating rod and adapted to ride on said trackway.

5. In an automobile engine control, in combination with the throttle valve, the main operating rod for the same, the throttle valve arm and the shaft operated by said arm extending down through the steering post, an arm fixed to the bottom end of said shaft, a bell-crank lever, a yielding device connecting said lever on one side with said second named arm, a rod connecting said bell-crank lever on the other side with said operating rod, and a foot pedal lever for positively moving the said operating rod in either direction.

In testimony, that I claim the foregoing as my invention, I affix my signature in the presence of two witnesses, this 28th day of September, A. D. 1921.

EDWIN B. WILES.

Witnesses:
W. R. York,
R. R. Robinson.